July 11, 1961

J. W. ADACUSKY 2,991,610

BOX CLOSING MACHINE

Filed Oct. 6, 1958

INVENTOR
Joseph W. Adacusky
BY
ATTORNEYS.

July 11, 1961 J. W. ADACUSKY 2,991,610
BOX CLOSING MACHINE
Filed Oct. 6, 1958 7 Sheets-Sheet 5

INVENTOR
Joseph W. Adacusky
BY
ATTORNEYS.

July 11, 1961 J. W. ADACUSKY 2,991,610
BOX CLOSING MACHINE
Filed Oct. 6, 1958 7 Sheets-Sheet 6

INVENTOR
Joseph W. Adacusky
BY
ATTORNEYS

United States Patent Office 2,991,610
Patented July 11, 1961

2,991,610
BOX CLOSING MACHINE
Joseph W. Adacusky, Philadelphia, Pa., assignor to Brock & Company, Inc., Philadelphia, Pa., a corporation of Pennsylvania
Filed Oct. 6, 1958, Ser. No. 765,364
15 Claims. (Cl. 53—376)

The present invention relates to mechanism for closing the flaps of cartons and boxes.

A purpose of the invention is to accomplish more reliable and rapid automatic closing of the flaps of boxes provided with ears or spears.

A further purpose is to permit the compression of the content of a box, such as a box of frozen food, and the closing of the box flap, notwithstanding that the content is of variant shape and initial volume.

A further purpose is to permit opening of a recess flap in a box and insertion of a box locking spear by automatic means as the box lid is closed.

A further purpose is to roll a side flap having a locking ear and depress a recess flap and then to force the locking ear into the recess as the box is progressed.

A further purpopse is to provide separate means to hold the side flaps of the lid and thus position the lid while the front flap and spear are bent and the spear is prepared for the insertion in a spear recess, and then to release the hold on the side flaps to allow the top to close.

Further purposes appear in the specification and in the claims.

In the drawings I have chosen to illustrate one only of the numerous embodiments in which the invention may appear, selecting the form shown from the standpoints of convenience in illustration, satisfactory operation and clear demonstration of the principles involved.

FIGURE 1 is a partial fragmentary diagrammatic top plan view of the device of the invention. In FIGURE 1 I have broken away the supporting structure for the upper end of the drive.

Describing in illustration and not in limitation and referring to the drawings:

In the prior art it has been difficult to apply automatic closing devices to the top flaps of boxes and cartons for some contents, particularly frozen foods, such as frozen French fried potatoes. This is true because the product is generally of heterogeneous orientation, due to the haphazard position of the pieces, and because of the freezing is relatively stiff and unyielding. During the closing operation, however, the volume of the product can be reduced by a settling and packing action, thus assuring that a mass which originally would not fit in the container will subsequently fit very nicely.

Because of these difficulties and particularly due to the fact that the content initially tends to overflow the container and later fills the container, standard closing devices have not given satisfaction, since they either do not close or close and form an ill-shaped carton, subject to internal residual pressure which may cause the carton to burst. The practice has therefore been generally adopted of closing such cartons by hand. This is unsatisfactory as it is slow, expensive, and yields an uneven product depending upon the skill and patience of the manual operator.

The present invention is designed to overcome these difficulties and to make possible the automatic closing of cartons and boxes notwithstanding that they may contain a content which initially bulges to overflowing, and which is subsequently compacted. The device of the invention yields a neat, smooth and firmly closed well-shaped container, which remains closed during storage and shipment.

While the invention is particularly adapted for cartons for frozen foods, it is also suited to closing of cartons and boxes for other processes.

Figure 14:
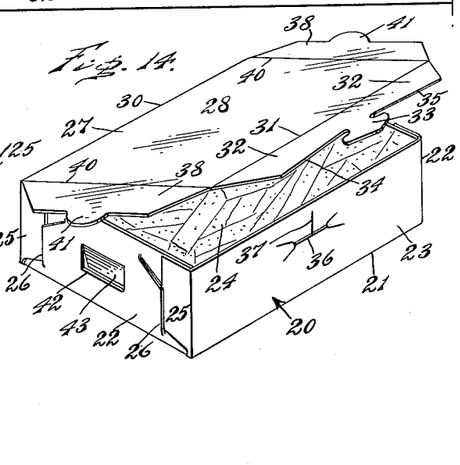
FIGURE 14 is a perspective of the box of the invention with the cover open.

Referring to FIGURE 14, I there illustrate a carton 20 suitably of cardboard, whose bottom 21, sides 22, and front and rear 23 have been closed to form the bottom of a box, and which contains a content 24, for example of frozen French fried potatoes. In the particular carton shown the front and back have ears 25, which enter and lock in ear recesses 26 of the sides as well-known. It will of course be understood that the sides and the ends can be held together in other suitable manner as desired.

The top 27 has a top body 28 which is suitably hinged by a fold line 30 to the back. The top has, hinged thereto at 31 by a fold line, a front flap 32 which carries at the center a locking spear 33, and has sloping edges 34 and 35 at either side of the spear. A spear recess 36 in the front is suitably relieved by a slot 37. The body of the top also has at the sides, side flaps 38 jointed to the top by fold lines 40 and provided with ears 41 which are adapted to enter ear recesses 42 in the sides which are provided with ear recess flaps 43.

The carton or box itself as thus described is suitably well-known in the art, and may be considered to be conventional.

The top closing machine of the invention comprises a frame 44, which mounts an approach conveyor 45 (FIGURES 1 and 2), a pair of transfer conveyors 46 located at the respective sides, a central main bottom conveyor 47, side main bottom conveyors 48 and a top conveyor 50, along with associated components to be described.

The approach conveyor 45 comprises shafts 51 carrying sprockets 52 keyed thereon, the shafts being journalled in the frame, and extending across the frame. The sprockets 52 mesh with chains 53 having flight projections 54 to engage and advance the box as later described. One of the shafts 51 has keyed thereon a drive sprocket 55, which meshes with a drive chain 56, which is common to various conveyors as later described, and is suitably tensioned by idlers 57.

The transfer conveyor 46 at each side comprises vertical shafts 58 and 60 journalled on suitable bearings on the frame (not shown which have keyed thereon sprockets 61 which mesh with chains 62 which carry pusher abutments 63 and depressor projections 64 which extend out radially in proper spaced relation as will be described.

The vertical shafts 60 carry thereon at their lower ends bevel gears 65 which mesh with bevel gears 66 on a cross-shaft 67 which is journalled in the frame on bearings not shown. The cross-shaft 67 has keyed thereon a sprocket 68 which meshes with the chain 56 previously mentioned to drive the transfer conveyors. At the top in a position to extend above the side and beneath the top of the box there is a hold-down finger 70 keyed on shaft 60 and which turns with the sprocket 61.

The central main bottom conveyor 47 is mounted on a cross-shaft 71 journalled in the frame on bearings not shown, and a cross-shaft 72 likewise journalled in the frame on bearings not shown. Keyed on the cross-shaft 71 is a sprocket 73 and keyed on the cross-shaft 72 is a sprocket 74 and the two sprockets mesh with a chain 75 which has a series of pusher flights 76 which are mounted thereon, and also a series of abutments 77 which engage the rear of the box. The shaft 71 also has keyed thereon a sprocket 78 which meshes with the chain 56 as already described so that the central main bottom conveyor is driven by this common chain which interrelates it with the other conveyors described.

On each side of the central main bottom conveyor, the side main bottom conveyors 48 are at one end advanced by sprockets 80 keyed on shaft 72. At the other end the bottom main side conveyors comprise cross-shaft 81 journalled in the frame on bearings not shown, on which is keyed sprockets 82 which mesh with side main bottom conveyor chains 83 which are meshed with the sprockets 82 at one end and sprockets 80 at the other end, and which carry a series of pusher flights 84 and a series of supporting pads 85 for the bottom of the box.

Figure 7:
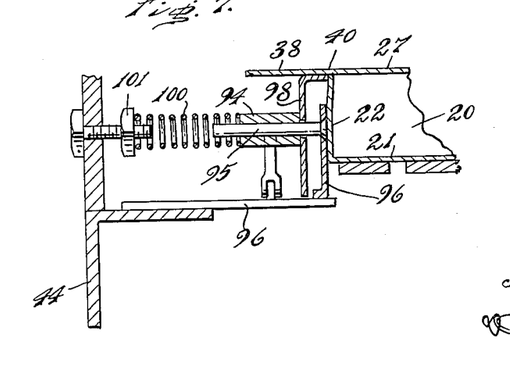
FIGURE 7 is a section on the line 7—7 of FIGURE 1.
Figures 8, 9:
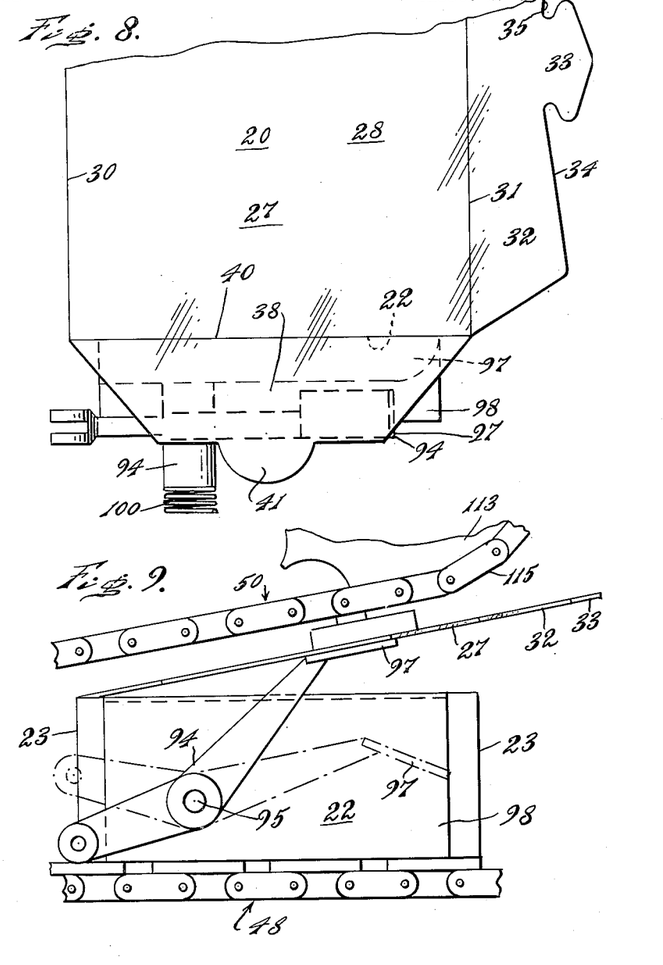
FIGURE 8 is an enlarged fragment of FIGURE 1 at the position of the arms which hold the top open.
FIGURE 9 is a fragmentary side elevation of FIGURE 8.

Keyed on shaft 71 is a switch cam 86 (FIGURE 2) which meshes with a switch operating cam follower 87 which controls the opening and closing of an electric switch 88 which is in series through a power source with solenoids 90, which when energized pull rods 91 pivotally connected at 92 to the solenoid armature, and at the top pivotally connected at 93 (FIGURE 2) to one end of box top holdup levers 94 which are pivoted intermediate their ends on pins 95 supported on brackets 96 FIGURES 7, 8 and 9). At the outer end of the levers 94 there are pads 97 which are adapted to engage the side flaps 38 of the top of the box. As best seen in FIGURE 7, each pin 95 also journals thereon a pusher and holding plate 98 which is slidable on the pin 95 and is pushed toward inward position under the side flap 38 and against the box side 22 by a helical compression spring 100 acting from an adjustable spring abutment 101 on the frame against the outer end of lever 94.

The plate 98 tends to exert a lateral compacting action on the relatively flexible side walls of the carton.

Figure 4:
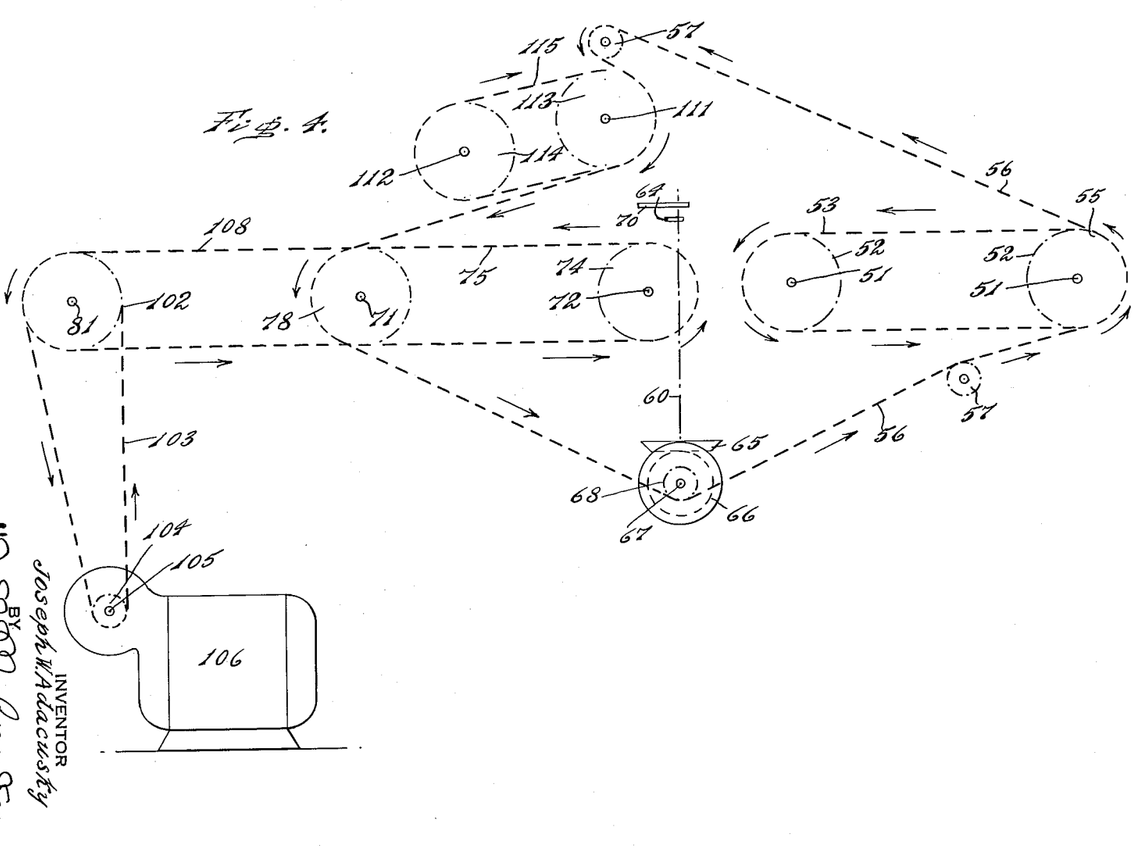
FIGURE 4 is a schematic central vertical section showing the drive.

The shaft 81 has keyed thereon a sprocket 102 (FIGURE 4) which meshes with a main drive chain 103, which at the other end meshes with a sprocket 104 on drive shaft 105 of a gear-in-head motor 106. Shaft 81 also has keyed thereon sprocket 107 (FIGURE 1) which by chain 108 drives sprocket 110 keyed on shaft 71. Thus, as seen in FIGURE 4, the drive from motor 106 extends through a chain and sprockets to shaft 81 and then from shaft 81 to shaft 71. Shaft 81 directly drives the side main bottom conveyor and also drives the central main bottom conveyor and also drives the interconnecting chains 56 which drives the approach conveyor, the side transfer conveyors and the top conveyor to be described.

Figures 15, 16:
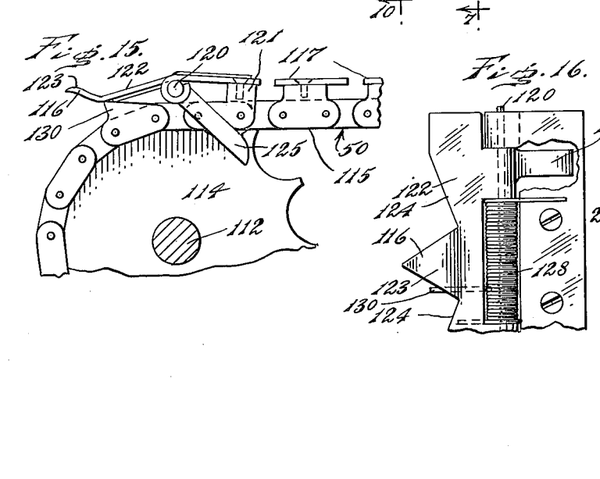
FIGURE 15 is a fragmentary enlargement of FIGURE 2.
FIGURE 16 is a fragmentary top plan view of FIGURE 15.

The top conveyor 50 comprises shafts 111 and 112 (FIGURES 2 and 4) extending across and journalled in the frame on bearings not shown, which have keyed thereon sprockets 113 and 114 which mesh with a chain 115 having spear depressors 116 and pads 117 mounted thereon. The shaft 111 has keyed thereon a sprocket 118 (FIGURE 1) which meshes with chain 56 (FIGURE 4) and thus drives the top conveyor. The spear depressors 116 as shown in FIGURES 15 and 16 are pivoted on the chain on pins 120, which are mounted upon supports 121 which are held on chain links and project rearward beyond the mounting links. The depressors 116 comprise depressor bodies 122 each mounting a spear 123 which is adapted to protrude into the spear recess 36 at the front of the box, with suitable tapering sides 124 which conform to the shape of the front lap of the carton cover.

The depressors have mounted thereon at the opposite sides beyond the top conveyor chain, cam follower arms 125 which engage in operative positions on a cam track 126 (FIGURE 2) which is mounted on a bracket 127 on the frame. Helical torsional springs 128 surrounding the pins 120 act on the supports 121 and the depressors 116 to urge the depressors into a position to maintain the follower arms 125 against the cam track 126.

To keep the spear end of the depressor from interfering with the chain, a special wedge link 130 is provided on the chain rearward of each pivot pin 120, which has an abutment deflecting the spear away from the chain.

The approach conveyor has sides 131 which extend past the side conveyors below the pusher abutments 63, and terminate before the pusher plates 98 are encountered. The approach conveyor also has fixed follower plates 132 (FIGURE 1) between its chains which terminate short of the main bottom conveyors. The top conveyors are supported on brackets 133 on the frame, which extend above and do not interfere with the bottom conveyors.

Figure 10:
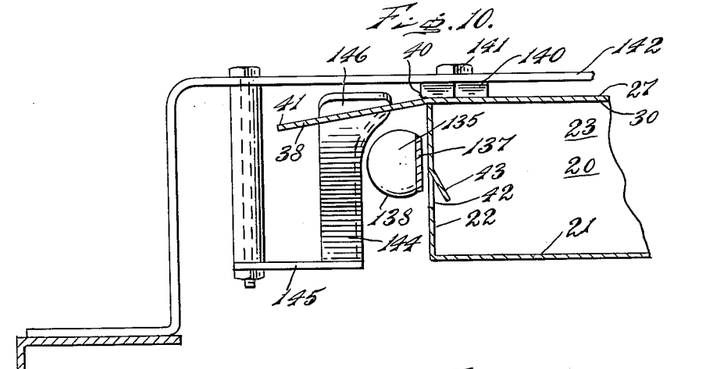
FIGURE 10 is a fragmentary section on the line 10—10 of FIGURE 1.
Figure 11:
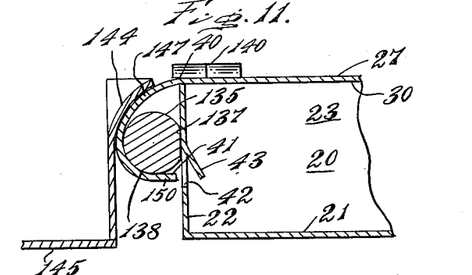
FIGURE 11 is a fragmentary section on the line 11—11 of FIGURE 1.

When the box moves forward on the bottom conveyors past the pusher plates it first encounters the inwardly guiding surfaces 134 (FIGURES 1 and 2) of progressively inwardly extending resilient metallic guides 135, extending in the general direction of motion of the carton, which are suitably mounted at 136 (FIGURE 1) at the rearward ends. The plates 135 are of rodlike formation having suitably a flat surface 137 pressing against the end of the box, as best seen in FIGURES 10 and 11, and having a circular upper and outer contour 138 (in cross section) around which the side flap 38 and its ear 41 can be rolled as later described. The diameter of the circle at 138 diminishes progressively from the rear end to the forward end of the guides 135 (see FIGURE 12).

Positioned on the inside above the edge of the box along the general line of the guides 135 I provide top plates 140 which are mounted at 141 (FIGURE 10) on bridges 142 extending across the top of the frame.

The side strips 135 on both their inner and outer edges are progressively converging inward as the box moves forward, thus compacting the sides of the box and also tending to move the bent portions of the side flaps progressively closer to the fold line of the side flaps at the top.

The top plates 140 suitably are provided with cutouts at their rear inner edge.

Figure 12:
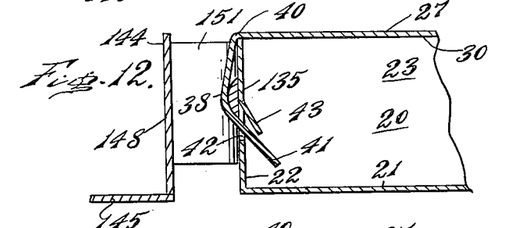
FIGURE 12 is a fragmentary section on the line 12—12 of FIGURE 1.
Figure 13:
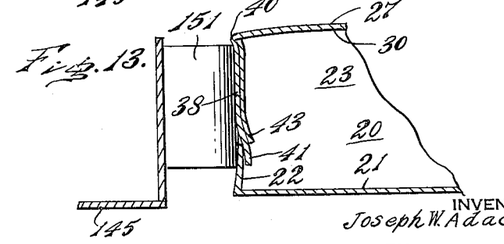
FIGURE 13 is a fragmentary section on the line 13—13 of FIGURE 1.

On the outside of each resilient converging guide 135 is provided a rigid side flap deflecting and closing guide 144, (FIGURES 1 and 10 to 13) which is conveniently mounted on brackets 145 which extend from the bridges 142. At the rearward end the guides 144 have downwardly and outwardly extending projections 146 which conform to and partially surround the rearward edges of the guides 135 and tend to engage and downwardly deflect the side flaps 38 of the cover of the box and its ear into the space between the guide 144 and the guide 135. As the box moves forward, a curved portion 147 of the guide 144 generally conforms to the outside of the curvature of the guide 135 (but on a larger radius) and tends to bend the flap 38 down around the guide 135. Beyond the turn over portions 147, the guides 144 continue straight at 148 (FIGURE 12), but the diameter and thickness of the guides 135 reduce, and the end 150 of the ear 41 on the box, tending to maintain the curvature that has been formed around the guide 135, projects into the recess 42 in the side of the box and inwardly deflects the recess ear 43 of the box as shown in FIGURES 11 and 12.

Finally, at the forward end the guide 144 has an inwardly deflecting lip 151 which pushes the side flaps 38 flat against the sides of the carton and forces the ears 41 fully into the recess 42 as the carton moves beyond the guides 135.

Figure 1:
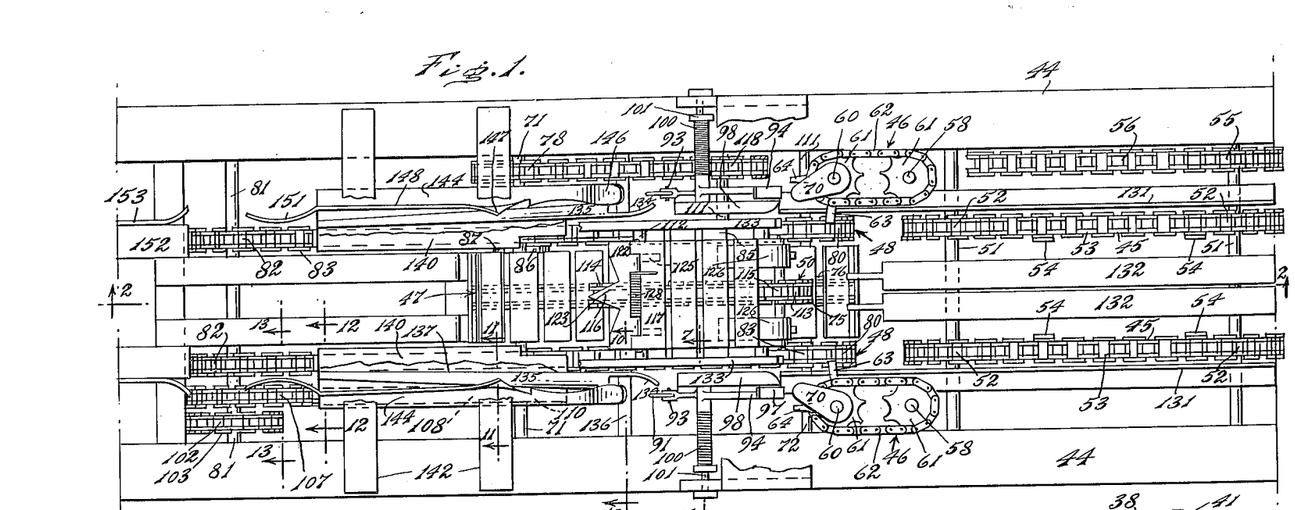
Figure 2:
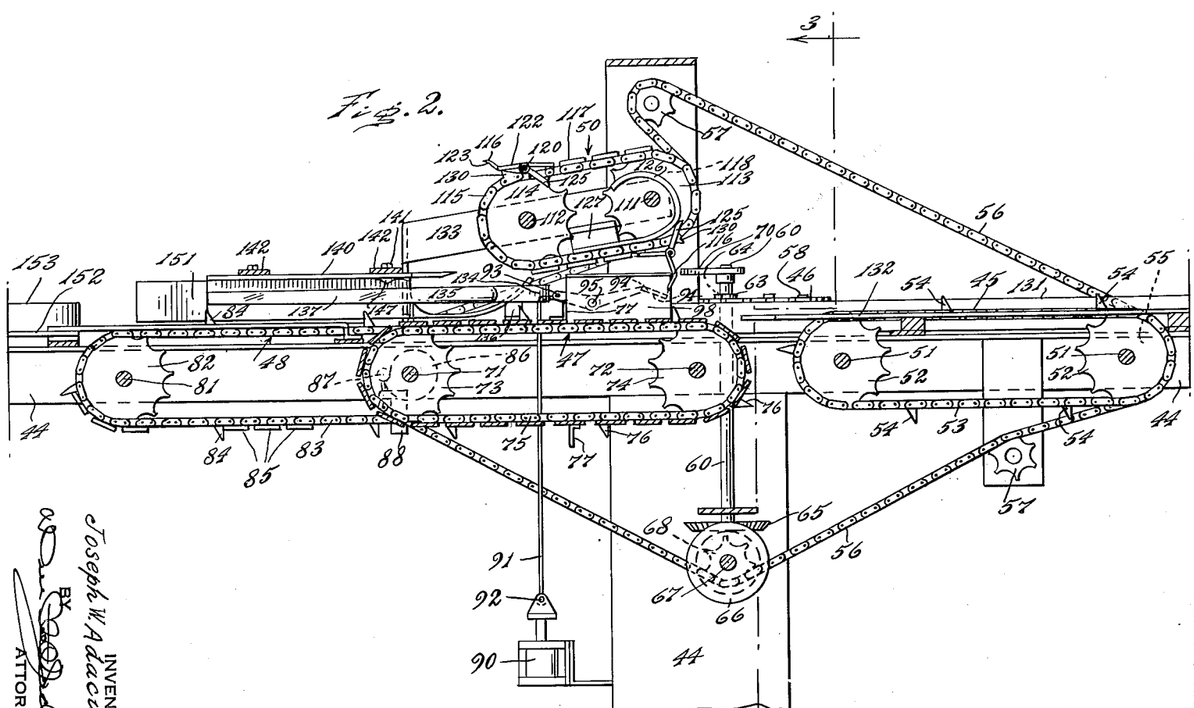
FIGURE 2 is a central vertical section of FIGURE 1 on the line 2—2.
Figure 3:
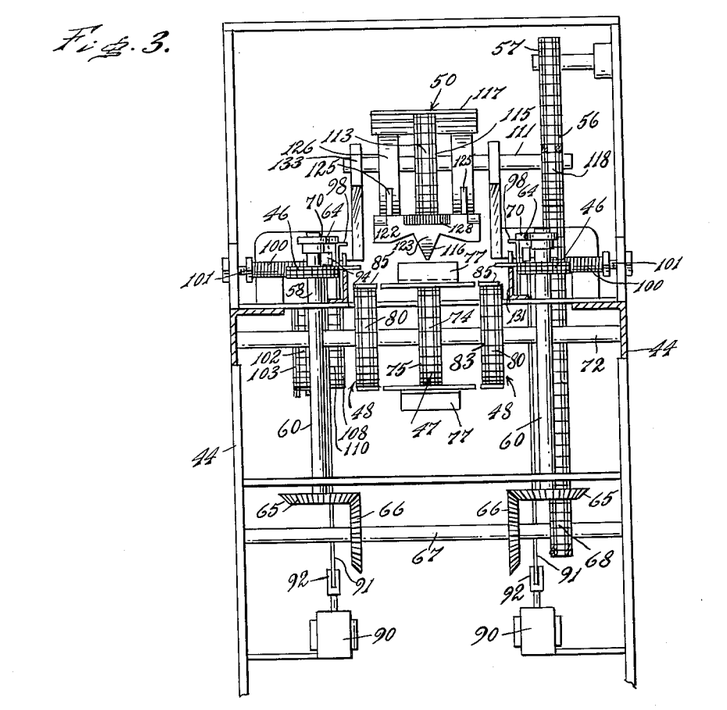
FIGURE 3 is a vertical transverse section of FIGURE 2 on the line 3—3.

Beyond the guide portion 151 the closed box is discharged on a bed 152 of the takeoff conveyor having sides 153 (FIGURE 1).

In operation of the device as described, the box with the hinged end 30 of the top or cover forward, the top open and the content fully charged, enters the approach conveyor 45 and is pushed forward by its flights. The box at its sides comes into engagement with the side transfer conveyors, and there pusher abutments 63 engage behind the box and move it forward. At the same time the depressor projections 64 enter the side recesses 42 and deflect the recess ears 43 inward and tend to bend them inward as shown in FIGURE 6.

Figure 5:
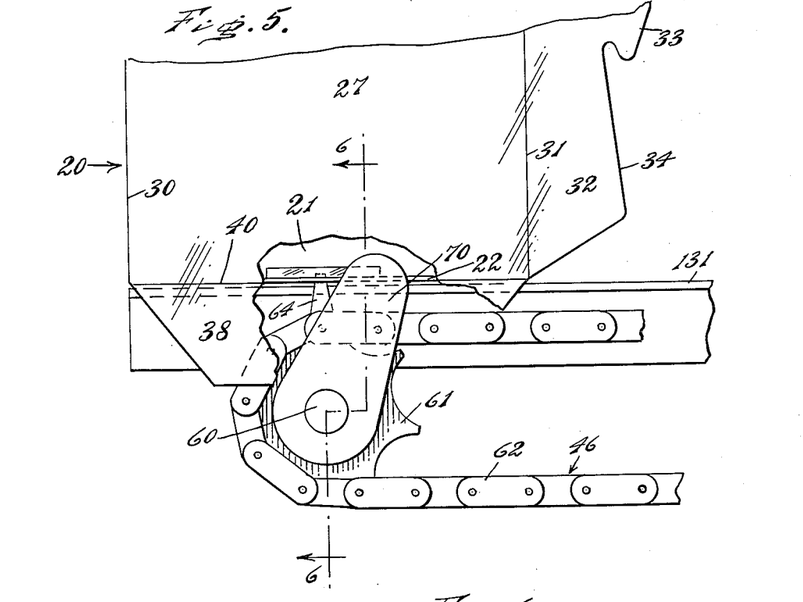
FIGURE 5 is a fragmentary enlargement of FIGURE 1.
Figure 6:
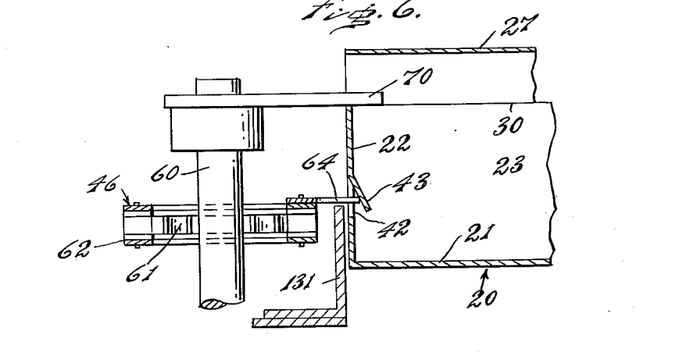
FIGURE 6 is a section on the line 6—6 of FIGURE 5.

At approximately the same time, the hold-down arms 70, best seen in FIGURES 5 and 6, extend across and engage the top of the box and its content beneath the lid at each side. The box is then fed forward on to the main conveyor, and the forward abutment 77 engages the rear of the box which is the forward portion. At the same time one of the flights of the side main bottom conveyors engages the front of the box which is the rearward portion. As the main bottom conveyors are moving the box forward, cam 86 (FIGURE 2) actuates switch 88 to energize solenoids 90 which cause the lever 94 to move counterclockwise in FIGURES 2 and 9 so as to raise the platforms 97 under the side flaps of the top of the box as best seen in FIGURES 8 and 9, holding the top of the box cover above the box proper at a slight angle as shown against the top conveyor 50. At this position cam 126 actuates the follower on depressor element 116 to bend down the rearwardly extending front flap 32 of the cover of the box until it extends almost vertically downwardly with its spear directed downwardly. At this point the cam 86 deenergizes solenoids 90 and the solenoids spring return to deenergized position, releasing the support which they have provided as shown in FIGURES 8 and 9 for the cover. The cover is now far enough down so that the outer edge of the spear is outside the rearwardly disposed front of the box and further action of the cam 126 forces the depressor clockwise in FIGURE 2, forcing the spear 123 of the depressor (FIGURE 16) and the spear 33 of the front flap 32 into the spear opening 36 and deflecting the spear recess flat at 37. As the box moves forward, the downwardly converging flights on the top conveyor 50 force the cover further downward, while at the same time the depressor guides the spear 33 into the spear opening 36 and permits it to lock. In the desirable setting of the conveyors, the box now moves slightly faster than the depressor 116, causing the depressor to move out of the spear opening 36.

As the box continues to move forward, the side flaps of the cover engage under the downwardly and outwardly extending guide fingers 146 of guides 144, tending to bend and roll the side flaps 38 of the cover downward. At about the same time the sides of the box are compressed with its content by converging guides 137, which engages the underside of top flaps 38 on the gradually reducing curved circumference of the guides 135. The effect is to curl the cardboard of the side flaps and direct the end of the ears 41 into the ear recesses 42, whose recess flaps 43 have already been bent inwardly as shown in FIGURE 6. As the box moves forwardly, the cover of the box is held by top plates 140 as the side flaps are more and more sharply bent around the diminished thickness of guide 135 which is constantly resiliently pushing the sides of the box inwardly. The resulting effect is to cause the ears 41 to penetrate the openings 42 and to establish the compression of the content and the forming of the carton and content in the desired shape.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In mechanism for closing cartons and the like, provided with hinged covers and flaps including a front flap having a spear adapted to enter a spear recess, conveyor means for progressing a carton forward, hold-down arms swingable from the sides and in one position engaging the top of the carton beneath the cover, means for holding the cover in partially raised condition, means acting on the front flap of the cover for bending the front flap downward while the cover is partially raised, and means for forcing the cover down on the carton and forcing a spear from the front flap into a spear recess in the carton.

2. Mechanism of claim 1, in which the carton has side flaps with ears, and the sides of the carton have ear recesses, in combination with means for gripping the cover at the sides, means for rolling the side flaps downwardly and inwardly and thereby directing an ear on each side flap toward the side of the carton, and allowing the ear to project into an ear recess and the side flaps to flatten against the sides of the carton, and means pressing the side flaps against the carton.

3. Mechanism of claim 2, in combination with deflector means operating before the side flap is pushed down for deflecting the material of the carton in the side ear-engaging recesses inwardly to assist in insertion of the ears on the side flaps.

4. In mechanism for closing a hinged cover having a front flap provided with a spear which is adapted to engage in a spear recess, and having side flaps provided with ears which are adapted to engage in ear recesses, conveyor means for projecting a carton forward with the hinge line edge in forwardmost position, means for engaging under the side flaps of the cover and holding the cover in partially raised position, deflector means acting on the front flap while the cover is partially raised, bending down the front flap, and directing the spear on the front flap into the spear recess at the front of the carton, and compressor means acting on the cover of the carton and progressively forcing the cover of the carton downward.

5. Mechanism of claim 4, in combination with hold-down arms swingable from the sides and means for bringing the hold-down arms into engagement with the ends of the carton beneath the cover before the front flap is bent down.

6. Mechanism of claim 4, in combination with depressor projections at the sides, and conveyor means for forcing the depressor projections into engagement with ear recess flaps in the ends of the carton as the carton moves forward.

7. Mechanism of claim 4, in combination with means operative after the cover is carried down for holding the cover in position against the carton, means operative on the side flaps for rolling the side flaps downwardly and inwardly and directing the ears of the side flaps toward the ear recesses in the sides of the carton and means for flattening out the side flaps against the sides of the carton and forcing the ears into engagement in the ear recesses.

8. Mechanism of claim 4, in combination with hold-down arms operative at the sides of the carton before the front flap on the carton is turned down, means for swinging the hold-down arms inward to engage the top of the carton beneath the cover, depressor projections at the sides, conveyor means for forcing the depressor projections into the ear recesses at the sides of the carton and thus opening the flaps of the ear recesses, means operative after the cover is forced down to hold the cover down at the sides, means for rolling the side flaps downwardly and inwardly, directing the ears on the side flaps toward cooperating ear recesses, and means for flattening the side flaps against the sides of the carton and thereby forcing the ears into full engagement in the ear recesses.

9. In mechanism for closing the front cover flap on a carton having a spear on the front cover flap and a spear opening, conveyor means for progressing the carton forward with the hinge of the cover directed forwardly, lever means acting on the side flaps of the cover and holding the cover partially raised, a conveyor above the carton having a pivoted depressor thereon provided with a spear, cam means for swinging the depressor into position to bend the front flap down, means for releasing the lever means from the cover, and top conveyor means having compressor surfaces and moving progressively downward to force the cover closed and forcing the spear of the front flap into the spear recess in the front of the carton.

10. Mechanism of claim 9, in combination with a cross-sectionally convex flap bending guide extending longitudinally of the progression of the carton on either side adapted to engage and assist in forming a curvature downward and inward of the side flaps, the convex surface diminishing in cross-section toward the forward end, a guide having a concave surface outside the convex guide at each side and extending longitudinally and assisting in curving the side flaps downward and inward and forming surfaces beyond the guides pressing the side flaps against the sides of the carton and forcing the ears into the ear recesses.

11. In mechanism for closing the hinged cover of a carton, conveyor means disposed at the sides of the carton having flights which progress the carton forward, pivoted hold-down arms mounted on the conveyor means and swinging across and engaging the top of the carton beneath the cover, and depressors mounted on the conveyor means extending into ear openings in the sides of the carton and deflecting flaps of the ear openings inward.

12. In mechanism for closing the hinged cover of a carton having side and front flaps, a conveyor moving forward and having flights which progress the carton, side plates which engage the sides of the carton, means resiliently engaging the sides of the carton and engaging the side flaps when the cover is pressed down, resilient means pressing the side flaps in against the sides of the carton, lever means at the sides of the carton having a raised position in which the side flaps of the cover are held partially raised and a depressed position in which the cover is permitted to move downward, means for controlling the motion of the lever means, depressor means engaging the front flap of the cover and folding the front flap and means for forcing the cover downward with the front flap folded.

13. Mechanism of claim 12, in which the depressor means includes a spear which enters a spear opening in the carton and forces a spear on the carton into the spear opening.

14. In mechanism to close a cover and cover flap on a carton having a spear, a bottom conveyor progressing the carton forward with the hinged line of the cover in forward-most position, a top conveyor having flights which extend above the carton converging progressively downward toward the bottom conveyor and adapted to progress the cover downward, a depressor pivoted on the top conveyor and having a spear, in one position being adapted to engage the front flap of the cover and bend it downward, the spear on the depressor forcing the spear on the carton into a spear recess, cam means cooperating with the depressor for moving the depressor into position to fold the front flap and insert the spear and means operating at the side for holding the cover up in partially raised position when the depressor folds the front flap.

15. In mechanism for closing a carton having a hinged cover, provided with side flaps having ears adapted to enter ear openings, an inner elongated resilient guide having a convex cross-section positioned at the sides of the carton at a level above the bottom of ear openings in the cartons, the inner surfaces of the guide converging to compress the carton, an outer guide extending along each side outside of the inner guide, having an approach portion which engages and bends the side flaps of the cover downward against the inner guide and having a convex portion which curves the side flaps downwardly and directs their ears toward the ear openings in the carton, the inner guide being of diminishing cross-section longitudinally, and there being a lateral pusher surface on the outer guide beyond the inner guide at each side which engages the side flaps, pushing the ears into the ear recesses and flattening the side flaps against the carton and compressing the carton laterally.

References Cited in the file of this patent
UNITED STATES PATENTS

| 2,051,339 | Little | Aug. 18, 1936 |
| 2,146,001 | William et al. | Feb. 7, 1939 |
| 2,461,410 | Guyer et al. | May 11, 1948 |
| 2,625,778 | Wood | Jan. 20, 1953 |
| 2,660,012 | Boyce et al. | Nov. 24, 1953 |
| 2,698,559 | Harkess | Jan. 4, 1955 |
| 2,803,934 | Lubersky | Aug. 27, 1957 |